United States Patent
Minami et al.

(10) Patent No.: US 6,694,245 B2
(45) Date of Patent: Feb. 17, 2004

(54) VEHICLE STATE ANALYSIS SYSTEM AND ITS ANALYSIS METHOD

(75) Inventors: Katsuaki Minami, Nagano (JP); Satoshi Kumagai, Nagano (JP); Takao Hamuro, Nagano (JP); Hideki Nagahara, Nagano (JP)

(73) Assignee: Miyama, Inc., Nagano (JP)

( * ) Notice: Subject to any disclaimer, the term of this patent is extended or adjusted under 35 U.S.C. 154(b) by 180 days.

(21) Appl. No.: 10/055,994

(22) Filed: Jan. 28, 2002

(65) Prior Publication Data

US 2002/0133288 A1 Sep. 19, 2002

(30) Foreign Application Priority Data

Feb. 1, 2001 (JP) .......................... 2001-025364

(51) Int. Cl.[7] .............................................. G06F 19/00
(52) U.S. Cl. ...................................... 701/114; 701/123
(58) Field of Search ................................ 701/100, 101, 701/102, 103, 123, 114; 73/117.3

(56) References Cited

U.S. PATENT DOCUMENTS 6,243,641 B1 * 6/2001 Andrews et al. ............ 701/102
6,272,848 B1 * 8/2001 Okude et al. ................. 60/274
6,305,161 B1 * 10/2001 Takanohashi et al. ......... 60/301
6,493,626 B2 * 12/2002 Mitani et al. ............... 701/103
6,523,503 B1 * 2/2003 Kracklauer ................. 123/1 A
6,568,178 B2 * 5/2003 Hirota et al. ................. 60/297
6,588,204 B2 * 7/2003 Hirota et al. ................. 60/297

FOREIGN PATENT DOCUMENTS

JP 2000-205925 * 7/2000

* cited by examiner

Primary Examiner—John Kwon
(74) Attorney, Agent, or Firm—Rabin & Berdo, P.C.

(57) ABSTRACT

A computing unit 3 of an analysis device 1 calculates a weight of fuel consumed by an engine 10 based on the weight of intake air and air fuel ratio of an engine of a vehicle to be analyzed detected by an air flow meter 14 and an air-fuel ratio sensor 16, and computes a fuel consumption rate based thereon and the running distance. The computation of fuel consumption rate does not require an injection pulse signal, so the fuel consumption rate can be precisely computed even for a vehicle which does not have an injection pulse signal such as a non-EGI vehicle or a diesel engine vehicle.

22 Claims, 12 Drawing Sheets

VEHICLE STATE ANALYSIS SYSTEM AND ITS ANALYSIS METHOD

FIELD OF THE INVENTION

This invention relates to a system for analyzing a vehicle state, such as fuel consumption rate and its analysis method.

BACKGROUND OF THE INVENTION

JP-A-2000-205925 published by the Japanese Patent Office in 2000 discloses a device for analyzing a vehicle state such as fuel consumption rate. This device computes a consumed fuel flowrate based on a fuel injection pulse signal output from an engine controller, computes a running distance based on a vehicle speed pulse signal output from a vehicle speed sensor, and computes a fuel consumption rate by dividing the computed running distance by the consumed fuel flowrate.

SUMMARY OF THE INVENTION

However, this device uses a fuel injection pulse signal for the computation of fuel consumption rate, i.e., it assumes a vehicle provided with an electronic fuel injection device (EGI), and cannot be applied to a non-EGI vehicle or a diesel engine vehicle which does not have a fuel injection pulse signal.

In a method which can be used with a non-EGI vehicle or a diesel engine vehicle, a brake specific fuel consumption is calculated by looking up an engine performance map (a map specifying a relation between an engine running condition and the brake specific fuel consumption), and fuel consumption rate is computed based thereon. However, such an engine performance map does not normally exist, and even if it did it would be difficult to acquire.

It is therefore an object of this invention to allow precise computation of fuel consumption rate without using a fuel injection pulse signal. It is a further object of this invention to provide an objective evaluation criterion of vehicle state by displaying the vehicle state including fuel consumption rate to the driver or manager.

In order to achieve above object, this invention provides a vehicle state analysis system for a vehicle including an engine, comprising a sensor which detects an air-fuel ratio of the exhaust of the engine, and a processor which functions to compute a weight of fuel consumed by the engine based on an intake air amount and the air-fuel ratio of the engine, and compute a fuel consumption rate of the vehicle based on the computed weight of consumed fuel and the running distance of the vehicle.

According to this invention, the weight of fuel consumed by the engine is calculated based on an intake air amount and air-fuel ratio of a vehicle to be analyzed, and fuel consumption rate is computed based on this and on the running distance. The conventional fuel consumption rate computation method used a fuel injection pulse signal and cannot therefore be applied to a vehicle which does not have a fuel injection pulse signal, but as the analysis system according to this invention does not use a fuel injection pulse signal to compute the fuel consumption rate, a computation of fuel consumption can be performed precisely even for a vehicle which does not have a fuel injection pulse signal such as a non-EGI vehicle or a diesel engine vehicle.

A sensor which detects the intake air amount and a sensor which detects the air-fuel ratio which are required for the computation are already installed in the vehicle, so if a system is constructed using these components, the analysis system can be made at low cost. The intake air amount is generally computed based on the intake air flowrate detected by an air flow meter. In another method, the intake air amount may be detected based on the absolute pressure in an intake manifold and the displacement of the engine.

The fuel consumption rate may for example be computed by converting the weight of consumed fuel into a consumed fuel flowrate by dividing by the fuel density, and dividing the running distance by this consumed fuel flowrate. When the vehicle is stationary, the fuel density may vary due to oil supply, etc., so when the vehicle is stationary, the fuel consumption rate may be computed more precisely if the fuel density is corrected.

If the air-fuel ratio is detected by a sensor installed in the exhaust passage of the engine, some time is required until the fuel burnt in the engine reaches the sensor installation position, and the gas in the exhaust passages also disperses, so the detected air-fuel ratio has a delay relative to the actual air-fuel ratio. Therefore, the precision of computing fuel consumption rate may be further improved by computing the weight of consumed fuel taking account of this delay.

If the computed fuel consumption rate is displayed to the driver, the driver can obtain an idea of the vehicle state in terms of specific figures, and this contributes to improving his driving technique. For example, the driver can appreciate ways of driving which impair-fuel cost-performance and ways of driving which improve fuel cost-performance through his own driving, so he can easily learn a way of driving which reduces the fuel consumption. The units used to display fuel consumption rate are generally [km/l], but this may be changed to other units (e.g., [kg/l] or [ton·km/l]) if necessary. Thus, to make a proper evaluation of fuel cost-performance when the vehicle to be analyzed is a transport truck and it is necessary to consider the effect of the load (total weight of vehicle), for example, [ton·km/l] may be used. The unit may be changed to another unit, for example [MPG], which is common in the country where this system is used.

If the excess drive force (=present drive force−running resistance) is displayed to the driver, and the driver is warned during hard braking or acceleration when there is a large effect on fuel cost-performance, in addition to fuel consumption rate, the driver may be made aware of ways of driving which adversely affect fuel cost-performance based on this information. If the reserve drive force (=maximum drive force−present drive force) is displayed to the driver, the driver may be made aware of how much acceleration performance is still available to him.

It is understood that, to make a precise computation of excess drive force, data such as the total weight of the vehicle or rolling resistance coefficient which is used for the computation, must be precise. If the total weight of the vehicle is corrected taking account of the changes in the total weight of the vehicle which may occur due to load variation when the vehicle is stationary, and if the rolling resistance coefficient is corrected at the timing at which the accelerator is off and the clutch of a transmission is disengaged, the excess drive force can be computed precisely.

The drive force of the vehicle to be analyzed may be computed based on the engine shaft torque calculated by looking up a predetermined map based on the accelerator depression amount and engine rotation speed. When such a map does not exist, it may also be computed by calculating the engine shaft torque based on the brake mean effective pressure obtained by subtracting a friction mean effective pressure according to the engine rotation speed from an indicated mean effective pressure which is calculated from the intake air amount per cycle and air-fuel ratio.

The maximum drive force used to compute the reserve drive force may be computed from the maximum value of the shaft torque which can be acquired from a catalogue, etc. When the maximum value of shaft torque is unclear, the brake mean effective pressure for maximum accelerator depression is computed by subtracting the friction mean effective pressure according to the engine rotation speed from the indicated mean effective pressure for maximum accelerator depression found by computation, the shaft torque for maximum accelerator depression is computed based thereon and the engine displacement, and the maximum drive force may then be computed based on this shaft torque for maximum accelerator depression.

The computed vehicle state (fuel consumption rate, excess drive force, reserve drive force) or selected gear position may be recorded on a record medium, and the data recorded on the record medium may be displayed (e.g., displayed on a display such as a manager's computer) after running. In this way, the manager can obtain an objective evaluation of the vehicle state, suitably manage the vehicles, select a suitable vehicle according to load and instruct the drivers suitably.

The detail as well as other features and advantages of this invention are set forth in the remainder of the specification and are shown in the accompanying drawings.

DESCRIPTION OF THE PREFERRED EMBODIMENTS

Figure 1:
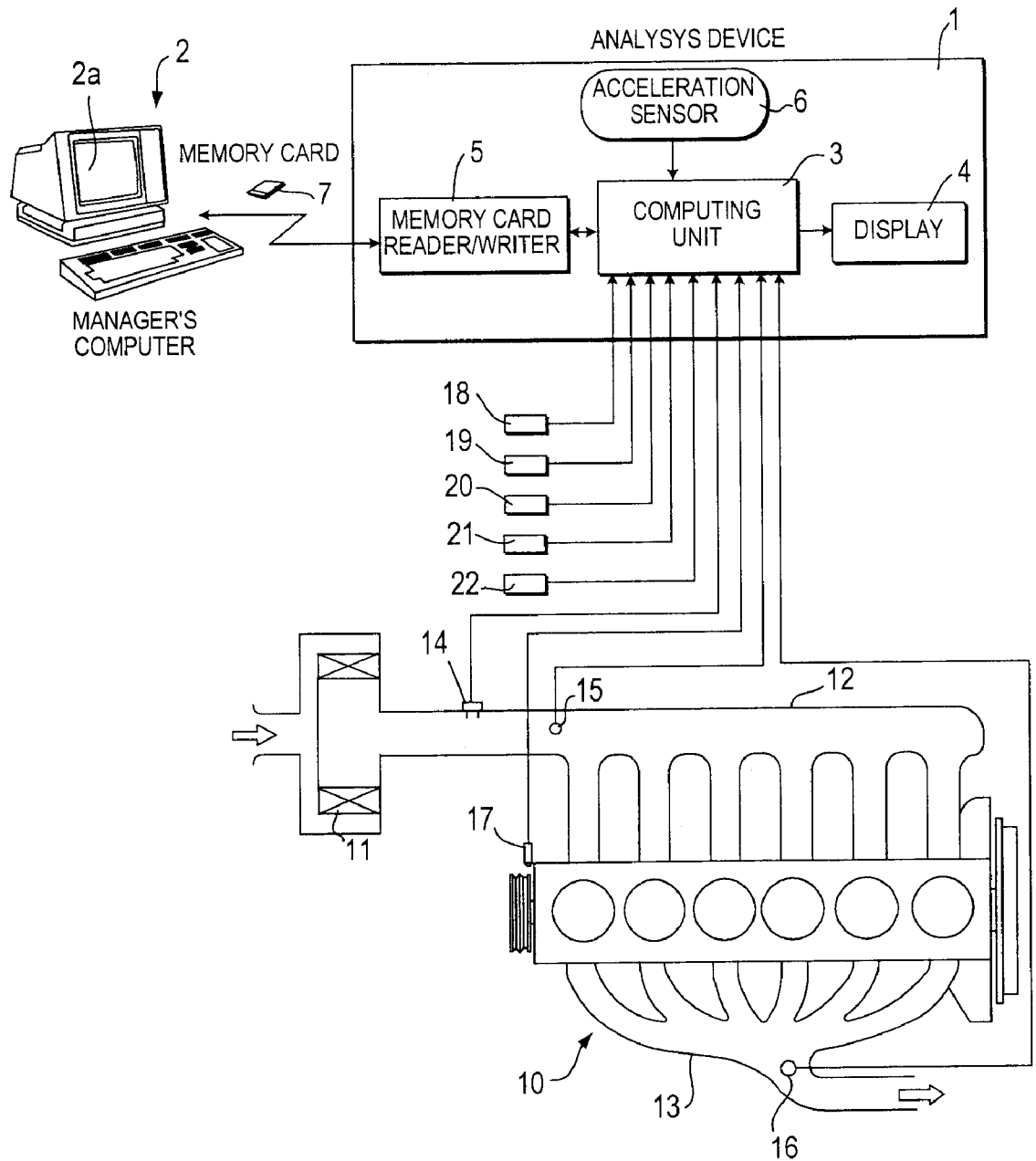
FIG. 1 is a schematic view of a vehicle state analysis system according to this invention and an engine of a vehicle to be analyzed.

Referring to FIG. 1 of the drawings, a vehicle analysis system according to this invention comprises an analysis device 1 installed on a vehicle to be analyzed, and a manager's computer 2 which is used for managing the vehicle.

An engine 10 of the vehicle to be analyzed is a common diesel engine. The engine 10 aspirates air into cylinders via an air cleaner 11 and an intake manifold 12, and discharges exhaust gas via an exhaust manifold 13. A heat wire air flow meter 14 which detects the flowrate of intake air is installed in the intake manifold 12. An intake air temperature sensor 15 which detects the intake air temperature is installed in the vicinity of the air flow meter 14.

An air-fuel ratio sensor 16 which detects an air-fuel ratio of the exhaust gas is installed in the exhaust manifold 13. The detected air-fuel ratio is used for air-fuel ratio feedback control of the engine 10, and also for computing the fuel consumption rate of the vehicle to be analyzed by computing the weight of fuel consumed by the engine 10, as described hereafter. In addition, a crank angle sensor 17 which detects the rotation speed of the engine, and a cooling water temperature sensor 18 which detects the temperature of cooling water, are attached to the engine 10.

The analysis device 1 comprises a computing unit 3, display 4, memory card reader/writer 5 and internal acceleration sensor 6. It is installed in the vehicle to be analyzed so that at least the display 4 is easily visible to the driver.

The computing unit 3 comprises one, two or more microprocessors, a RAM, ROM and an input/output interface. A torque map for specifying the relation between the shaft torque of the engine 10 relative to the accelerator depression amount and engine rotation speed, and various data required for computing the vehicle state described hereafter, are stored in the ROM.

Signals are input to the computing unit 3 from above-mentioned sensors attached to the engine 10, a vehicle speed sensor 19 which detects the vehicle speed of the vehicle to be analyzed from the transmission output shaft rotation speed, an accelerator depression amount sensor 20 which detects the accelerator pedal depression amount due to the driver, a fuel temperature sensor 21 which detects the temperature of the fuel supplied to the engine 10, and a gear position sensor 22 which detects the gear position at which the vehicle is presently running. The computing unit 3 computes the vehicle state, e.g., the fuel consumption rate, excess drive force and reserve drive force of the vehicle to be analyzed based on this input data. The computed vehicle state is displayed on the display 4, and recorded on a memory card 7 by the memory card reader/writer 5. The times for which various gear positions are selected during running and the running distance in each gear position are also recorded on the memory card 7.

Management software is installed in the manager's computer 2. The manager's computer 2 receives computation results for the vehicle state recorded while the vehicle is running from the memory card 7 which is a read/write record medium, and uses them for analysis and display of data recorded on the memory card 7.

The specific features of the system will now be described.

1. Initialization of sensors and correction of engine torque map

When the vehicle state is analyzed by this system, firstly, the accelerator depression amount sensor 20 and internal acceleration sensor 6 are initialized. The initialization of the accelerator depression amount sensor 20 is performed by detecting the sensor output values when the accelerator pedal is fully released and when it is fully depressed. The initialization of the internal acceleration sensor 6 is performed using a spirit level attached to the device.

When the sensor initialization is complete, the torque map of the engine 10 is then corrected. The reason why the torque map is corrected is because a discrepancy arises between the torque map and the actual engine performance due to age deterioration, and this discrepancy must be corrected to precisely compute the vehicle state. This correction is performed based on data measured when the vehicle starts running.

Specifically, torque data for full accelerator depression are computed when the vehicle is run under a first trace condition (accelerator depression amount is greater than 70%), and the accelerator depression amount and engine rotation speed at a predetermined torque are measured when the vehicle is run under a second trace condition (accelerator depression amount is between 30% and 70%). Both trace conditions are set for a road gradient of zero, water temperature specification value, acceleration state and empty vehicle state. The engine torque is computed by the following Equation (1):

$$Te = \frac{R \cdot r}{it \cdot if \cdot \eta} \quad (1)$$

R is the running resistance [N] computed using Equation (2) to Equation (7) described later, r is the dynamic loaded radius of the tires [m], it is the speed ratio in the gear position at that time, if is the final reduction gear ratio and $\eta$ is the transmission efficiency.

The torque map is corrected based on this measured data. By performing the correction based on the running data when the vehicle is running under full load and under partial load, the torque map may be corrected to a fairly precise one.

2. Computation of vehicle state based on running data

When a precise torque map has been obtained as described above, the computation of vehicle state used for the analysis begins. Here, as indicators of the vehicle state, the excess drive force, reserve drive force and fuel consumption rate (average fuel consumption rate, instantaneous fuel consumption rate) are computed, and hard braking/acceleration which has a large influence on fuel consumption is also determined. Specifically, first, basic data is computed, and the computation of vehicle state is then performed using the computation results for this basic data.

2.1 Computation of basic data

A rolling resistance coefficient $\mu r$, a running resistance R and a drive force F are computed as basic data used for the computation of vehicle state.

The rolling resistance coefficient $\mu r$ is data used for computing a rolling resistance Rr described later, and varies according to the road surface condition (dry, wet, condensation or snow), and the type and the degree of wear of tires. The measurement of data used for computing the rolling resistance coefficient $\mu r$ is performed when the accelerator depression amount is 0% and the clutch of the transmission is disengaged. For example, if the data measurement is set to be performed during the instant of a gear change (a short time, but satisfying the above conditions), the data required for computing the rolling resistance coefficient $\mu r$ can be measured without requiring the driver to drive the vehicle in any special way for the purpose of data measurement. Specifically, the rolling resistance coefficient $\mu r$ is computed by the following Equation (2):

$$\mu r = \frac{1}{g} \cdot \frac{v1 - v2}{\Delta t} \quad (2)$$

based on a speed v1 [m/s] when deceleration begins and a speed v2 [m/s] after a predetermined time $\Delta t$ has elapsed. g in Equation (2) is the acceleration due to gravitational acceleration (=9.8 [m/s$^2$]) (idem in other Equations).

Next, the running resistance R [N] is computed by the following Equation (3):

$$R = Rr + Rl + Rs + Ra \quad (3)$$

by calculating a hill-climbing resistance Rs [N], acceleration resistance Ra [N], air resistance Rl [N] and rolling resistance Rr [N].

Here, the hill-climbing resistance Rs is computed by the following Equation (4):

$$Rs = W \cdot g \cdot \sin\theta \quad (4)$$

by calculating a gradient angle $\theta$ from the difference between the acceleration including the perpendicular direction detected by the internal acceleration sensor 6, and the forward/reverse acceleration al [m/s$^2$] of the vehicle computed based on the vehicle speed signal. W [kg] is the total weight of the vehicle.

The acceleration resistance Ra is the resistance due to inertia acting when the vehicle accelerator or decelerates. The acceleration resistance Ra is computed by the following Equation (5):

$$Ra = al \cdot (W + Wr) \quad (5)$$

based on the forward/reverse acceleration al [m/s$^2$] of the vehicle computed based on the vehicle speed signal, the total weight of the vehicle W [kg], and a rotating parts equivalent weight Wr [kg]. The rotating parts equivalent weight Wr is an equivalent mass of rotating parts such as the engine, power transmission system and vehicle wheels.

The air resistance Rl is a resistance due to collision between the vehicle and air while it is running. The air resistance Rl is computed by the following Equation (6):

$$Rl = \frac{1}{2} \cdot \rho \cdot Cd \cdot A \cdot V^2 \quad (6)$$

based on the air density $\rho$ [kg/m$^3$], air resistance coefficient Cd, frontal projected area A [m$^2$] and vehicle speed V [m/s].

The rolling resistance Rr is the resistance between the tires and the road surface. The rolling resistance Rr is computed by the following Equation (7):

$$Rr = \mu r \cdot W \cdot g \quad (7)$$

based on the rolling resistance coefficient $\mu r$ and total weight of the vehicle W [kg].

The drive force F [N] is the force which drives the vehicle due to the output from the engine. The drive force F is computed by the following Equation (8):

$$F = \frac{Te \cdot it \cdot if \cdot \eta}{r} \quad (8)$$

based on a shaft torque Te [N·m] of the engine 10 obtained by looking up a torque map, speed ratio it in the gear position presently selected, final reduction gear ratio if, transmission efficiency $\eta$ and tire dynamic loaded radius r [m].

2.2 Computation of vehicle state

Once the basic data has been computed as described above, the computation of excess drive force, reserve drive force and fuel consumption rate, and determination of hard braking/hard acceleration, are performed as indicators of the vehicle state.

The excess drive force is a value obtained by subtracting the running resistance R (except the acceleration resistance Ra) from the drive force F transmitted via the engine 10. If the value of the excess drive force is negative, the vehicle is decelerating, and if it is positive the vehicle is accelerating. The excess drive force is computed because, if the excess drive force is exceedingly great, it can be considered that excessively large drive force is acting on the vehicle, and it can be determined that it is necessary to perform an up-shift operation immediately or reduce the accelerator depression amount to a suitable amount.

Here, to precisely compute the excess drive force, an excess drive force correction is also performed concurrently. Specifically, when the vehicle is running with a constant accelerator depression amount and the engine rotation speed is constant, the excess drive force is zero, so if the computation value of excess drive force is not zero when the vehicle is in this state, the torque map is modified if a map is used or the computation Equation (8) for drive force is corrected if a map is not used so that the computation value for excess drive force is zero.

The reserve drive force is a value obtained by subtracting the present drive force F from a drive force Fm transmitted by the engine 10 when the accelerator depression amount is a maximum at the engine rotation speed at that time (when the shaft torque of the engine 10 is a maximum). The reserve drive force indicates the extent to which the drive force can be increased from this running state, i.e., it indicates how much acceleration performance remains to be exploited. The drive force Fm is computed by calculating the maximum value of the shaft torque at the engine rotation speed at that time by looking up the torque map, and substituting this in Equation (8).

To compute the fuel consumption rate, the flowrate v [m/s] of intake air detected by the air flow meter 14 is multiplied by an air passage cross-sectional surface area S [m$^2$] in the part where the air flow meter 14 is installed, so as to compute the volumetric flowrate [m$^3$/s] of air passing in unit time. Further, if the air temperature detected by the intake air temperature sensor 15 is Tair [° C.], the air density at the intake air temperature Tair [° C.] is 273/(273+Tair) times $\rho_{a0}$, so the weight Qa [kg/s] of intake air per unit time may be computed by the following Equation (9):

$$Qa = S \times v \times \rho_{a0} \times 273/(273+\text{Tair}) \quad (9)$$

Figure 2:
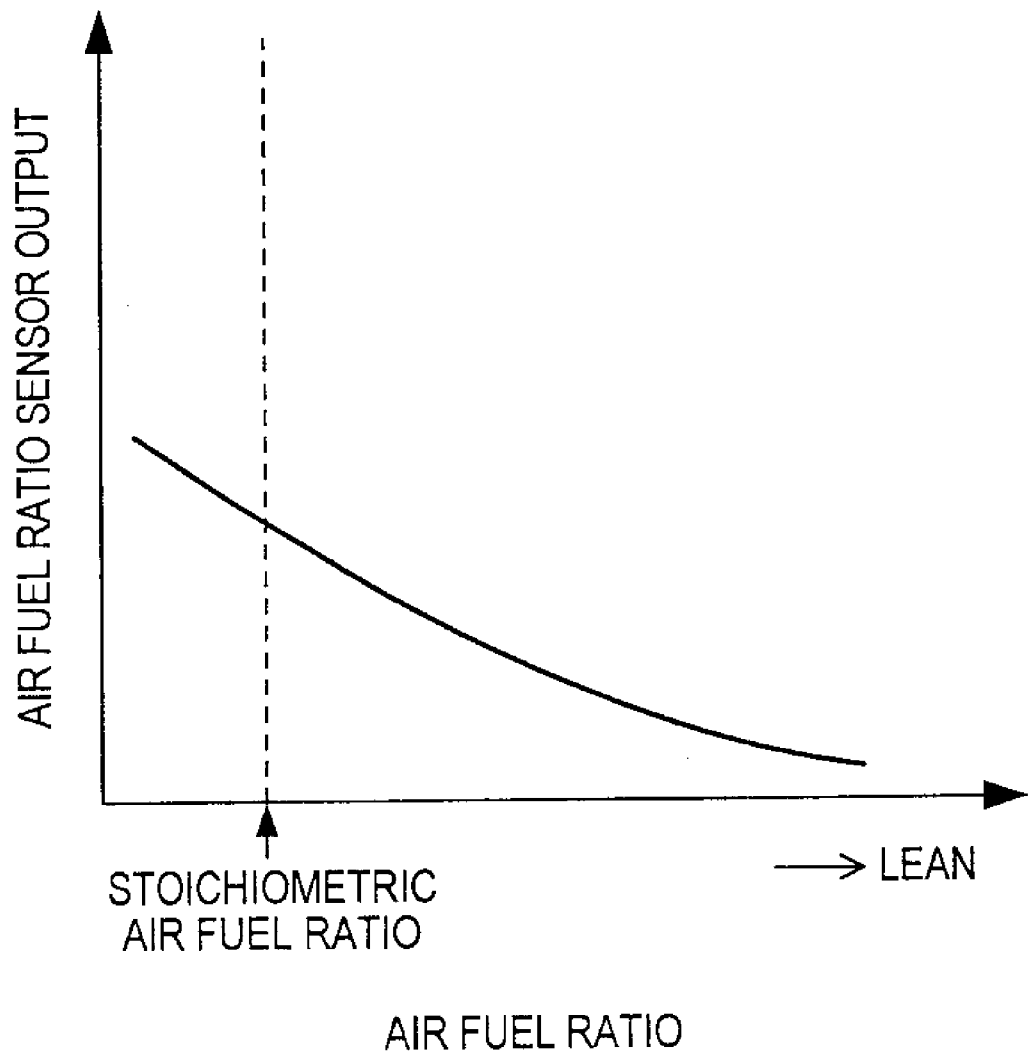
FIG. 2 is a diagram showing output characteristics of an air-fuel ratio sensor.

The output characteristics of the air-fuel ratio sensor 16 installed in the exhaust manifold 13 are as shown in FIG. 2, and an air-fuel ratio A/F may be calculated from the output of the air-fuel ratio sensor 16. The air-fuel ratio A/F is the ratio of the intake air weight Qa to the weight Qf of fuel supplied, so the weight Qf [kg/s] of fuel supplied in unit time to the engine 10 may be calculated, based on the weight Qa [kg/s] of intake air calculated by Equation (9) and the fuel ratio A/F, by the following Equation (10).

$$Qf = Qa/(A/F) \quad (10)$$

For example, if Qa is 0.075 [kg/s] and A/F at that time is 25, the weight Qf of fuel consumed in unit time may be computed to be 0.075/25=3×10$^{-3}$ [kg/s].

If this is divided by the fuel density pf [kg/l], it gives the volumetric flowrate Vf [l/s] of fuel consumed in unit time, and if we also multiply by the running time Tr [s], the flowrate Lf [l] of the fuel which is consumed may be calculated as shown by the following Equation (11):

$$Lf(\text{l}) = \frac{Qf(\text{kg/s}) \cdot Tr(\text{s})}{\rho f(\text{kg/l})} \quad (11)$$

Further, if the running distance D [km] obtained by integrating the vehicle speed based on the vehicle speed signal, is divided by the flowrate Lf of consumed fuel, the fuel consumption rate rf [km/l] may be computed as shown by the following Equation (12):

$$rf(\text{km/l}) = \frac{D(\text{km})}{Lf(\text{l})} \quad (12)$$

The fuel consumption rate may be computed for example as the present instantaneous fuel consumption rate and the average fuel consumption rate over the past 10 minutes. If the instantaneous fuel consumption rate has the highest value among the past fuel consumption rate data, it is stored as the maximum fuel consumption rate.

Here, the unit of fuel consumption rate rf was given as [km/l] which shows the running distance [km] per 1 [l] of fuel, but it may also be given as [km/kg] which shows the running distance [km] per 1 [kg] of fuel, or as [ton·km/l] which takes account of the total vehicle weight. Alternatively, it may be given as [l/100 kg] which shows the flowrate of consumed fuel in a predetermined running distance (100 km, 1 mile), or MPG (miles per gallon). Further, arrangements may be made to select suitable units from these as necessary.

The output of the air-fuel ratio sensor 16 is delayed relative to the actual air-fuel ratio, so the fuel consumption rate may also be computed taking account of this delay.

Figure 3:
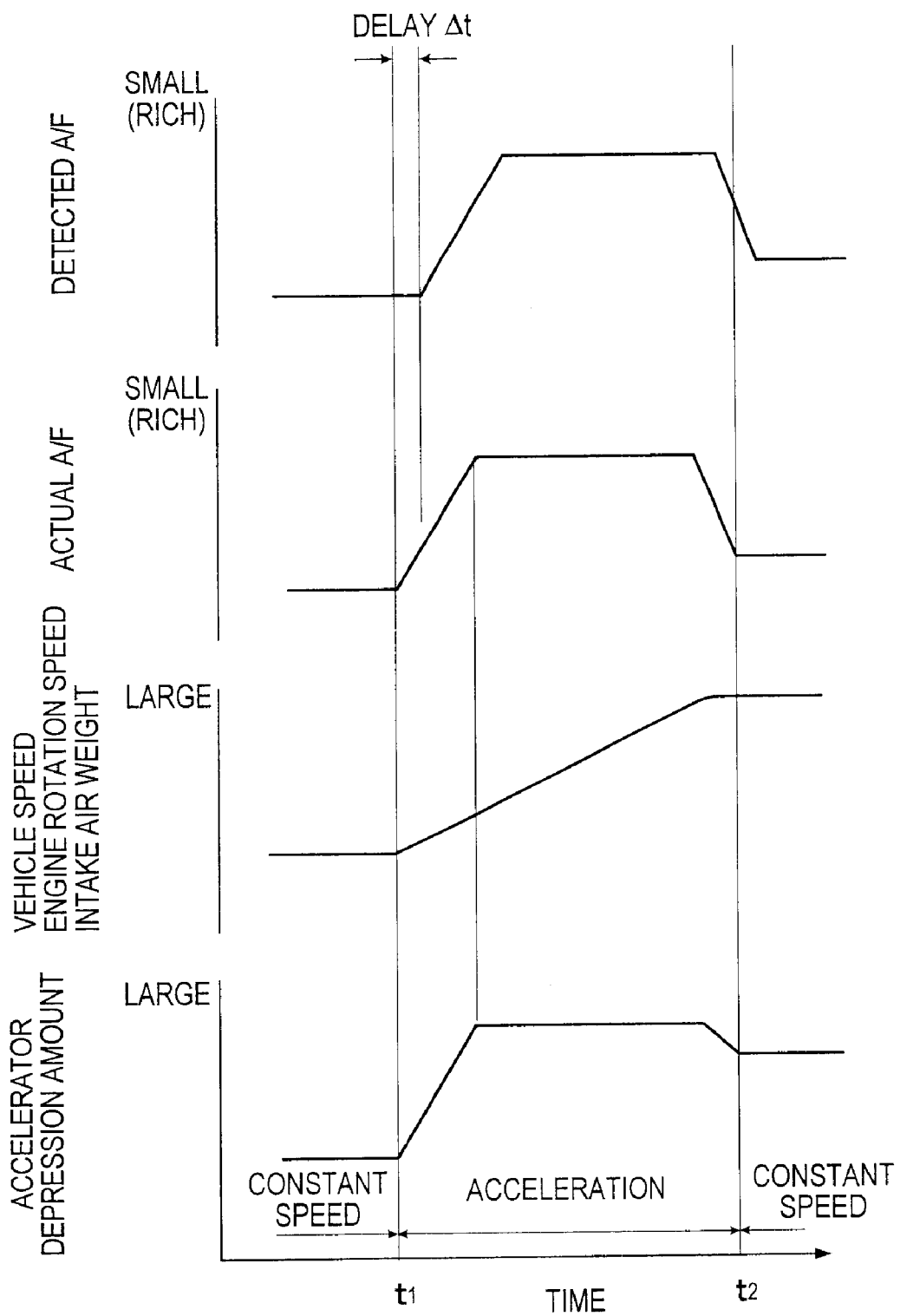
FIG. 3 is a time chart showing how the air-fuel ratio sensor output is delayed relative to an intake air amount variation.

When the accelerator pedal is depressed at a time t1 and the vehicle is accelerated until a time t2, as shown in FIG. 3, the actual air-fuel ratio becomes richer as the accelerator depression amount increases, but some time is required until this fuel is burnt in the cylinder, and the exhaust gas reaches the air-fuel ratio sensor 16 installed in the exhaust manifold 13. Also, as there is some dispersion of the gas in the exhaust pipe, the air-fuel ratio detected by the air-fuel ratio sensor 16 is delayed by an amount Δt relative to the actual air-fuel ratio. This delay increases the greater the volume of the pipe from the exhaust gas valve of the engine 10 to the air-fuel ratio sensor 16, and decreases the higher the rotation speed of the engine 10. For example, if the delay time was 60 [ms] when the rotation speed of the engine 10 is 2000 [rpm], it would be 40 [ms] when the engine rotation speed was 3000 [rpm].

To take account of this detection delay, a table which specifies the delay time at various rotation speeds may be provided, the intake air amount at a delay time Δt prior to the present time obtained by looking up the table stored, and this result divided by the air-fuel ratio detected by the air-fuel ratio sensor 16. In this way, the instantaneous weight of consumed fuel at a time Δt before the present time can be fairly precisely computed. If this instantaneous weight of consumed fuel is then integrated, the weight of consumed fuel within this time can be calculated, and if this is then divided by the fuel density, the volume of fuel consumed can be calculated.

The determination of hard braking/hard acceleration is performed by calculating the forward/reverse acceleration based on the variation amount of the vehicle speed detected by the vehicle speed sensor 19. For example, if the forward/reverse acceleration of the vehicle exceeds ±0.78 [m/s²], it is determined that hard braking or hard acceleration was performed.

2.3 Data correction when the vehicle is stationary

The vehicle state is computed as described above. To precisely compute the running state, it is of course necessary that the data used for the computation are precise. However, when the vehicle is stationary, the density/viscosity of the fuel may vary due to fuel temperature change or change in the type of fuel supplied, and the total weight W of the vehicle and rolling resistance coefficient μr may also vary due to fluctuation in the load. Therefore, if the vehicle is stationary for more than a predetermined time (e.g., 10 minutes), the data are corrected.

Specifically, when the vehicle has started moving again after it has been stationary, the total weight of the vehicle is computed based on the running data measured when certain conditions are satisfied, i.e., the accelerator depression amount is 70% or more, the gradient is zero and the water temperature is a specified value, by the following Equation (13):

$$W = \frac{F - Rl}{g \cdot \mu r + \frac{v2 - v1}{\Delta t}} - Wr \cdot \frac{v2 - v1}{\Delta t} \quad (13)$$

v1 [m/s] is the speed when acceleration starts, v2 [m/s] is the speed after the predetermined time of Δt seconds, F [N] is the drive force and Rl [N] is the air resistance. As the computation result cannot be less than the total weight of the vehicle when it is empty, the total weight of the vehicle is not corrected when the total weight W of the vehicle is less than the total weight of the vehicle when it is empty.

The density/viscosity of the fuel is corrected based on the fuel temperature detected after it has been affected by the fuel temperature, and the rolling resistance coefficient μr is computed by Equation (2) based on the running data measured during gear change as described in "2.1: Computation of basic data".

3. Display/recording of vehicle state

When the vehicle state has been computed as described above, the computation results are displayed in real time on the display 4.

Figure 4:
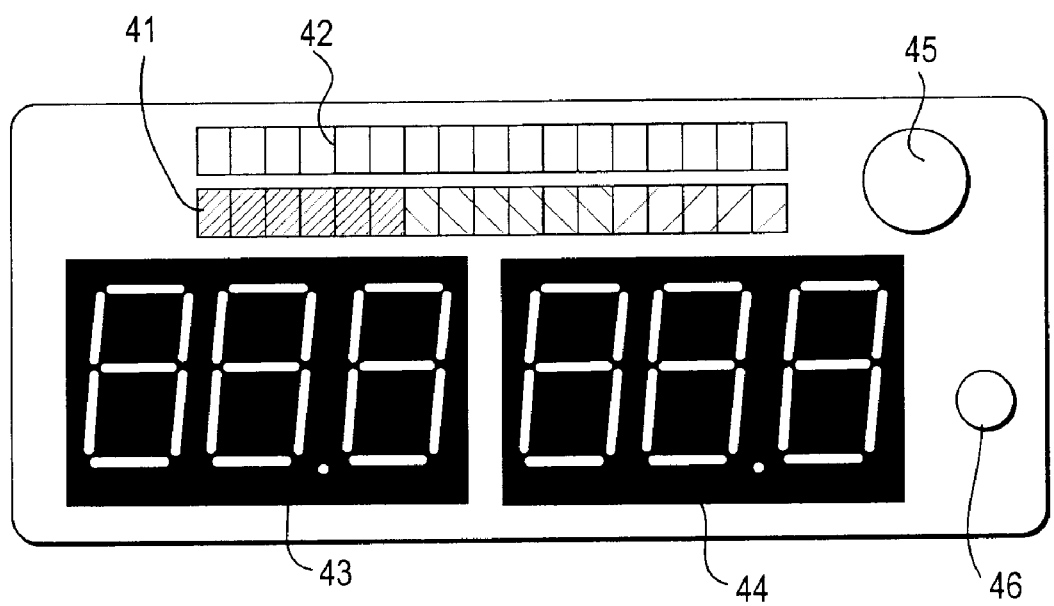
FIG. 4 is a diagram showing the detailed construction of a display of an analysis device.

FIG. 4 shows the detailed construction of the display 4. The display 4 comprises an excess drive force meter 41, reserve drive force meter 42, average fuel consumption rate meter 43, present fuel consumption rate meter 44, hard braking/hard acceleration warning lamp 45 and power supply lamp 46.

The excess drive force meter 41 displays the computed excess drive force in the form of a bar graph. The color changes in the order green, yellow, red as the excess drive force increases, and is green in a recommended running region wherein the excess drive force is less than a target value. The reserve drive force meter 42 displays the computed reserve drive force in the form of a bar graph, and the bars become longer the more the reserve drive force increases.

The average fuel consumption rate meter 43 displays the average fuel consumption rate during the past 10 minutes. The present fuel consumption rate meter 44 displays the present instantaneous fuel consumption rate. The maximum fuel can also be displayed as a flashing display, and the display units can also be varied according to the units of computed fuel consumption rate.

The hard braking/hard acceleration warning lamp 45 lights and warns the driver when it is determined in the computing unit 3 that hard braking or hard acceleration was performed (e.g., when the forward/reverse acceleration of the vehicle exceeds ±0.78 [m/s²]). The method of alerting hard braking/hard acceleration may also be another method, e.g., ringing a warning buzzer or displaying a warning message.

By providing this display 4 to display the vehicle state, the driver can appreciate the vehicle state in real time, and the driver can make use of this information to improve his driving technique.

4. Analysis of vehicle state

After the vehicle has been driven, various data relating to the vehicle state recorded in the memory card 7 are read by the manager's computer 2, and after performing various analyses, it is displayed on the display 2a of the manager's computer 2.

Figure 5:
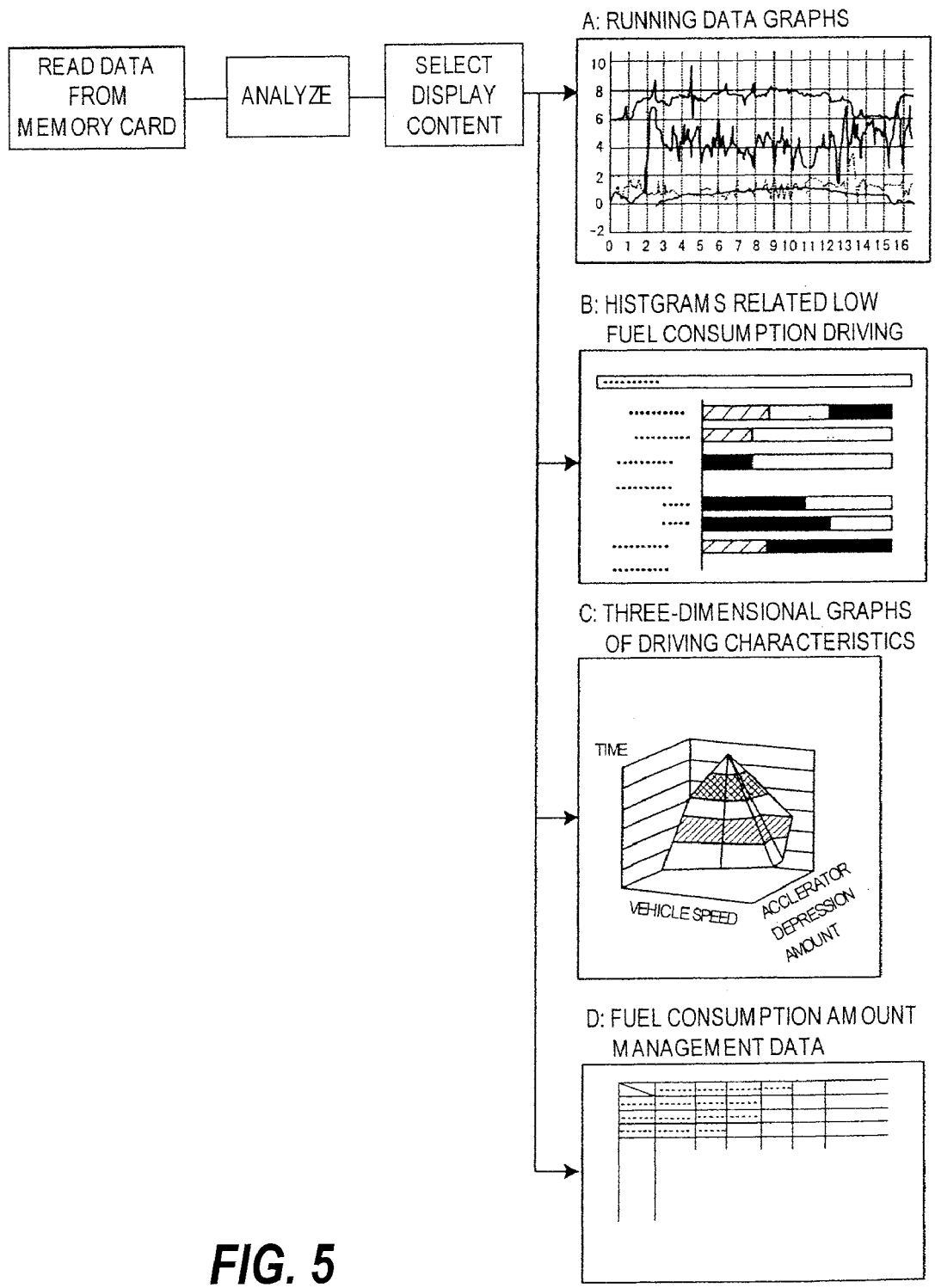
FIG. 5 is a diagram showing a vehicle state analysis procedure.

The information displayed on the display 2a is "A. RUNNING DATA GRAPHS", "B. HISTOGRAMS RELATED TO LOW FUEL CONSUMPTION DRIVING", "C. THREE-DIMENSIONAL GRAPHS OF DRIVING CHARACTERISTICS" and "D. FUEL CONSUMPTION AMOUNT MANAGEMENT DATA". The manager can freely select the information to be displayed. FIG. 5 shows the analytical procedures performed at this time.

"A. RUNNING DATA GRAPHS" include "accelerator depression amount", "engine rotation speed", "forward/reverse acceleration", "gear position" and "road gradient". This display shows how these parameters vary with time on the horizontal axis.

"B. HISTOGRAMS RELATED TO LOW FUEL CONSUMPTION DRIVING" includes "excess drive force", "idling stop", "racing", "deceleration due to inertia", "hard braking/hard acceleration", "uniform velocity running", "speed distribution", "waveform running analysis" and "gear position".

In "excess drive force", which is one of the display items, the magnitude of the excess drive force is divided into three stages (corresponding to the display on the excess drive force meter 41), the display showing how much time each stage occupies relative to the total running time. In "idling stop", for example, an idling stop is determined when the engine rotation speed is zero for a stationary time of 120 seconds or more, and this idling stop time when the vehicle is stationary is displayed. The fuel amount saved due to this idling stop is also displayed concurrently. In "racing", for example, racing is determined when the engine rotation speed is 1000 [rpm] or higher and the vehicle speed is zero, and the number of times the vehicle has been racing is displayed. Further, the fuel amount used due to this is also displayed.

In "deceleration due to inertia", the deceleration is determined to be due to inertia when the forward/reverse acceleration of the vehicle is within a reference value, and the proportion of deceleration due to inertia in the total number of decelerations is displayed. In "hard braking/hard acceleration", the deceleration when the deceleration is equal to or greater than a reference value is considered to be hard braking, and the acceleration when it is above the reference value is considered to be hard acceleration (corresponding to the determination of the computing unit 3). The proportion of hard brakings in the number of times the vehicle is braked, and the proportion of hard accelerations in the number of times the vehicle accelerates, are displayed. In "uniform velocity running", it is determined that the vehicle is running at uniform velocity when the vehicle speed remains constant for 10 seconds or longer. Here, the proportion of running time at uniform velocity in the total running time, and the proportion of running distance at uniform velocity in the total running distance, are displayed. In "speed distribution", the proportion of the running time spent in each speed region (e.g., every 20 [km/h]) relative to the total running time is displayed.

In "waveform running", the way in which the vehicle speed varies when the vehicle is running at constant speed and this vehicle speed is maintained constant, is calculated by comparing the difference between this vehicle speed and the actual vehicle speed with a threshold value, and this proportion is displayed. In "gear position", the frequency (frequency in terms of running time or running distance) with which gear positions are selected during running is displayed. The running distance in each gear position, and the proportion of running distance in each gear position relative to the total running distance, are also displayed.

In "C. THREE-DIMENSIONAL GRAPHS OF DRIVING CHARACTERISTICS", time is displayed on the Z axis, and two of the items accelerator depression amount, engine rotation speed, vehicle speed and gear position are displayed on the X axis and Y axis. In "D. FUEL CONSUMPTION AMOUNT MANAGEMENT DATA", the running distance, fuel consumption, fuel consumption rate, total weight of the vehicle and amount of fuel supplied are displayed.

Thus, the vehicle state is displayed without modification, or in a modified/processed form, on the display 2a of the controlling computer 2, so the manager can acquire a more detailed understanding of the vehicle state, and can utilize it for an objective evaluation when assessing the vehicle state. Further, as the vehicle state is displayed in terms of specific figures, target values or management standards for improving the vehicle state can be set precisely. Moreover, the driver can use the analysis results displayed for him to improve his own driving technique, and experienced drivers can instruct inexperienced drivers by having them observe vehicle states for experienced drivers.

The above data is an example of the data which may be displayed on the display 2a of the manager's computer, but other data apart from the data described here may also be displayed according to the needs of the manager.

Next, a second embodiment of this invention will be described.

Figure 6:
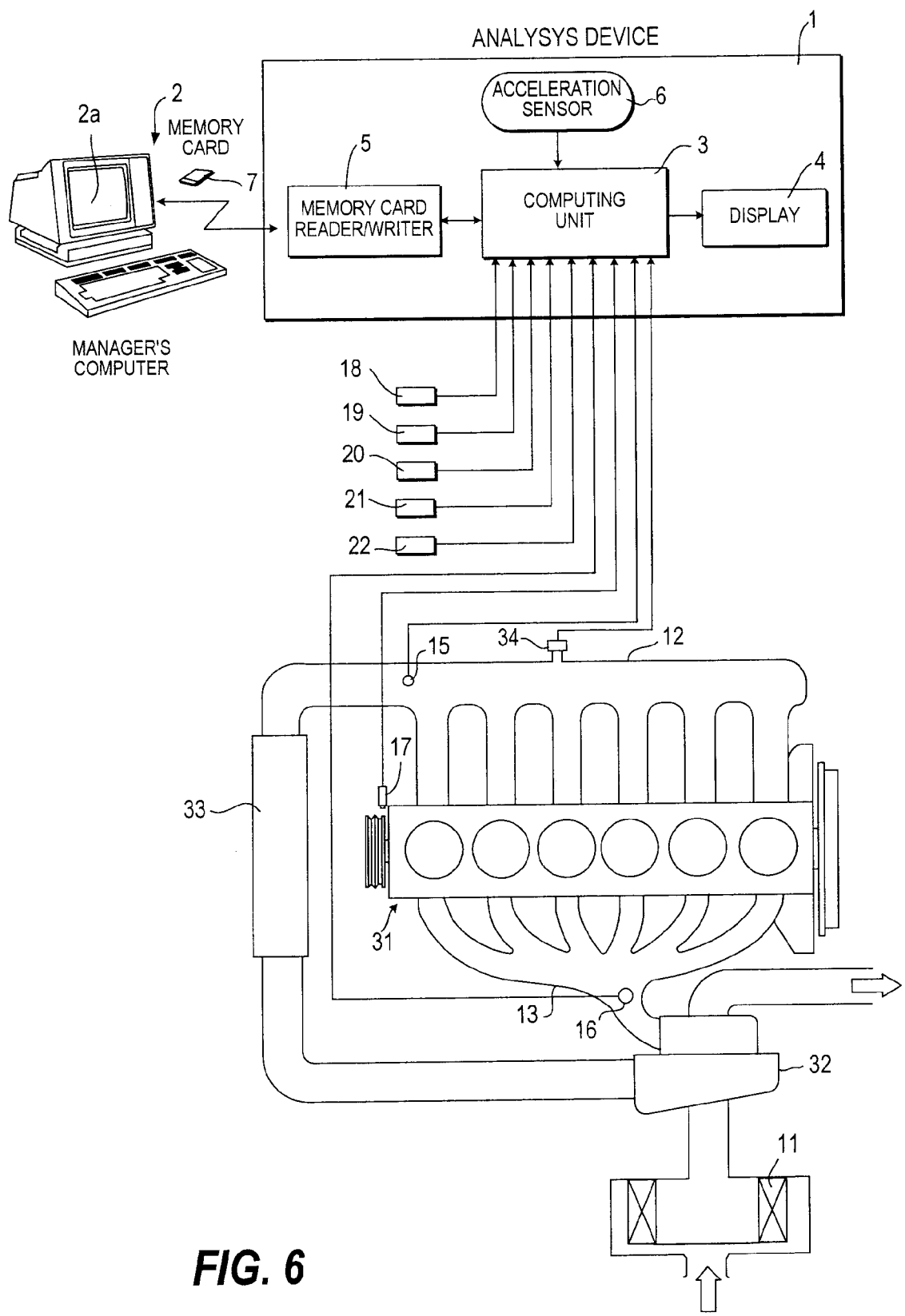
FIG. 6 is similar to FIG. 1, but showing a second embodiment of this invention.

In this embodiment, an engine 31 of the vehicle to be analyzed is provided with a supercharger such as an exhaust turbocharger, as shown in FIG. 6. The method of computing the weight Qf of consumed fuel in the computing unit 3 is different from that of the preceding embodiment. Identical elements to those of the preceding embodiment are assigned the same reference numbers (idem for other embodiments).

In the engine 31, air is filtered by the cleaner 11, and compressed by a compressor in an exhaust turbocharger 32. After its temperature is lowered in an intercooler 33, it passes through the intake manifold 12 to be aspirated by the engine 31. An absolute pressure P [hPa$_{abs}$] of the air in the intake manifold 12 is detected by an absolute pressure sensor 34.

If the engine rotation speed detected by the crank angle sensor 17 is N [rpm] and the displacement of the engine 31 is Vh [m³], as the intake amount in two revolutions is Vh in the case of a four stroke engine, the weight Qa of intake air in the case of a four stroke engine is given by the following Equation (14):

$$Qa = (Vh/2) \times (N/60) \times (P/1013) \times \rho_{a0} \times 273/(273+Tair) \quad (14)$$

Here, the atmospheric pressure in the normal state is 1013 [hPa]. If Qa is divided by the air-fuel ratio A/F detected by the air-fuel ratio sensor 16, the weight Qf of fuel supplied to the engine 31 in unit time may be calculated. The remaining features of processing such as the computation of the fuel consumption rate are identical to those of the preceding embodiment.

The weight Qf of consumed fuel may also be computed by this method. This method can also be applied to a normal aspiration engine without modification, but it is particularly effective in the case of an engine with a supercharger such as an exhaust turbocharger.

Figure 7:
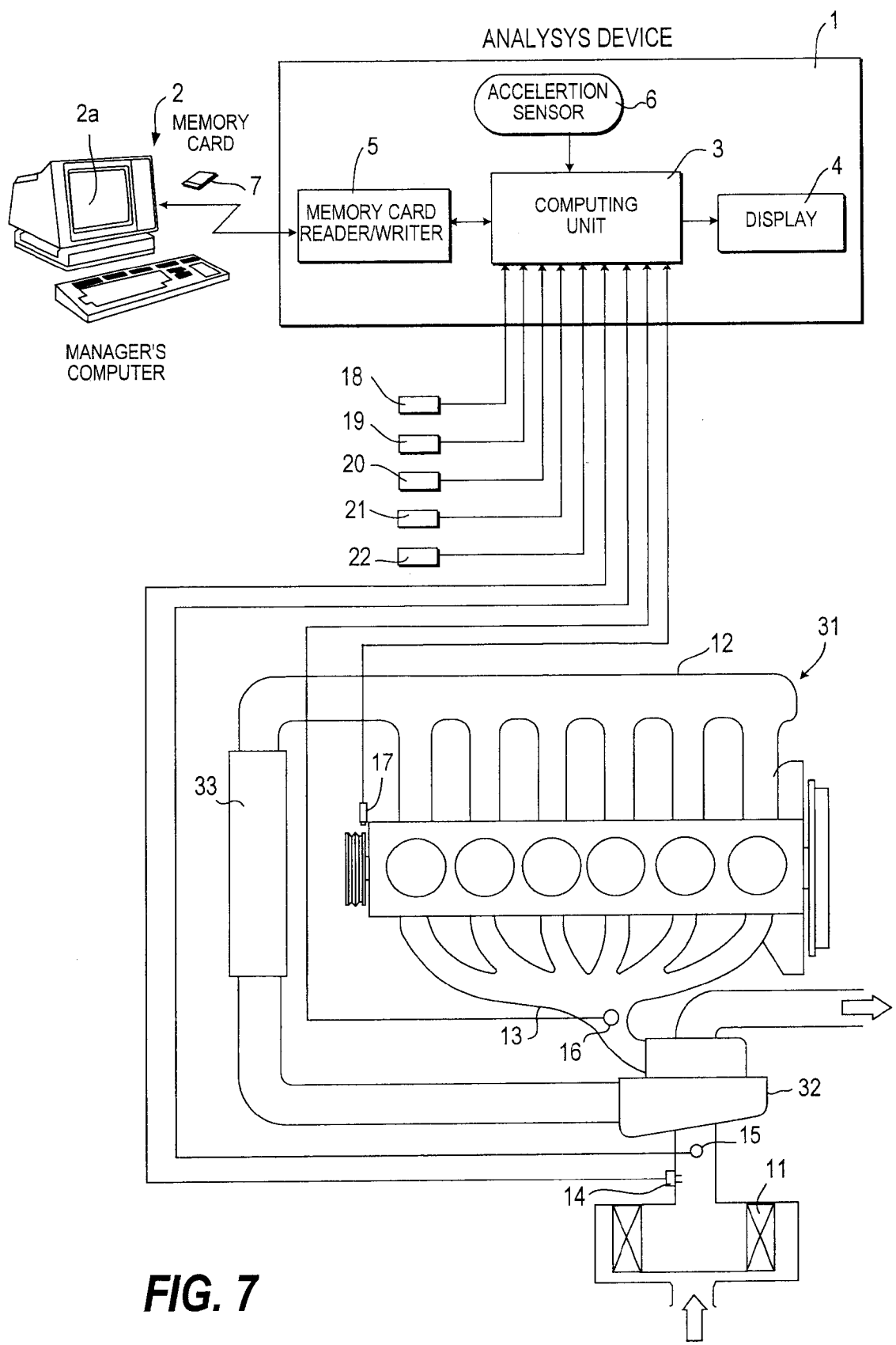
FIG. 7 is similar to FIG. 1, but showing a third embodiment of this invention.

In the case of an engine with a supercharger such as an exhaust turbocharger, as shown in FIG. 7, the air flow meter 14 may be installed at the inlet to the turbocharger 32, the weight Qa of intake air calculated by an identical computation to that of the first embodiment based on the air flowrate detected by the air flow meter 14 and the air temperature detected by the intake air temperature sensor 15 installed in the vicinity of the airflow meter 14, and the weight Qf of consumed fuel computed by dividing this by the air-fuel ratio detected by the air-fuel ratio sensor 16 installed in the exhaust manifold 13 (third embodiment).

Figure 8:
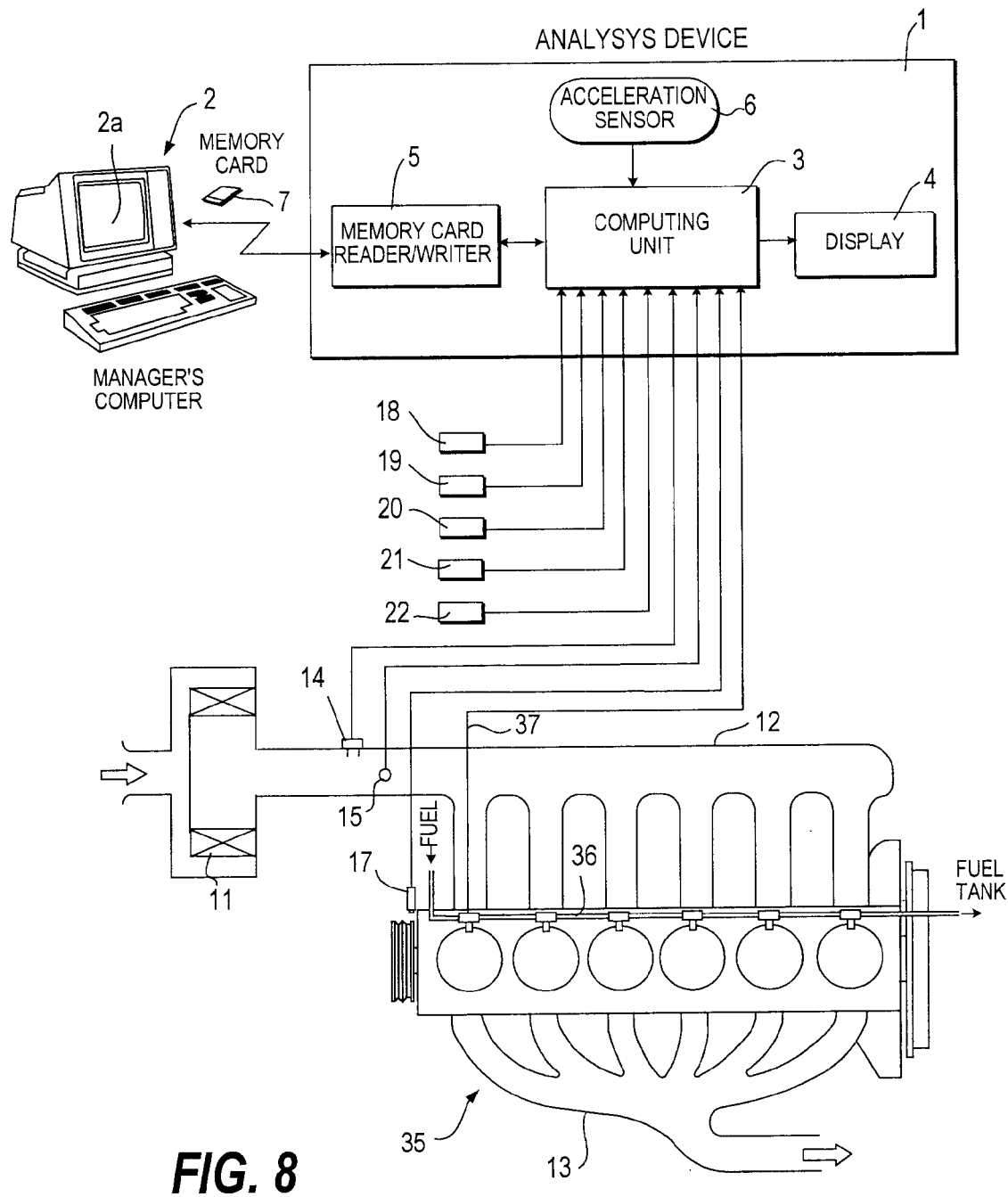
FIG. 8 is similar to FIG. 1, but showing a fourth embodiment of this invention.

In a fourth embodiment shown in FIG. 8, the vehicle to be analyzed is provided with a common rail diesel engine. In this case, instead of computing the weight of consumed fuel from the weight of intake air and the air-fuel ratio, the volume of consumed fuel may be calculated from the fuel injection pulse width. 36 in the figure is a fuel distributor pipe, and 37 is a fuel injection pulse signal extraction line.

Figure 9:
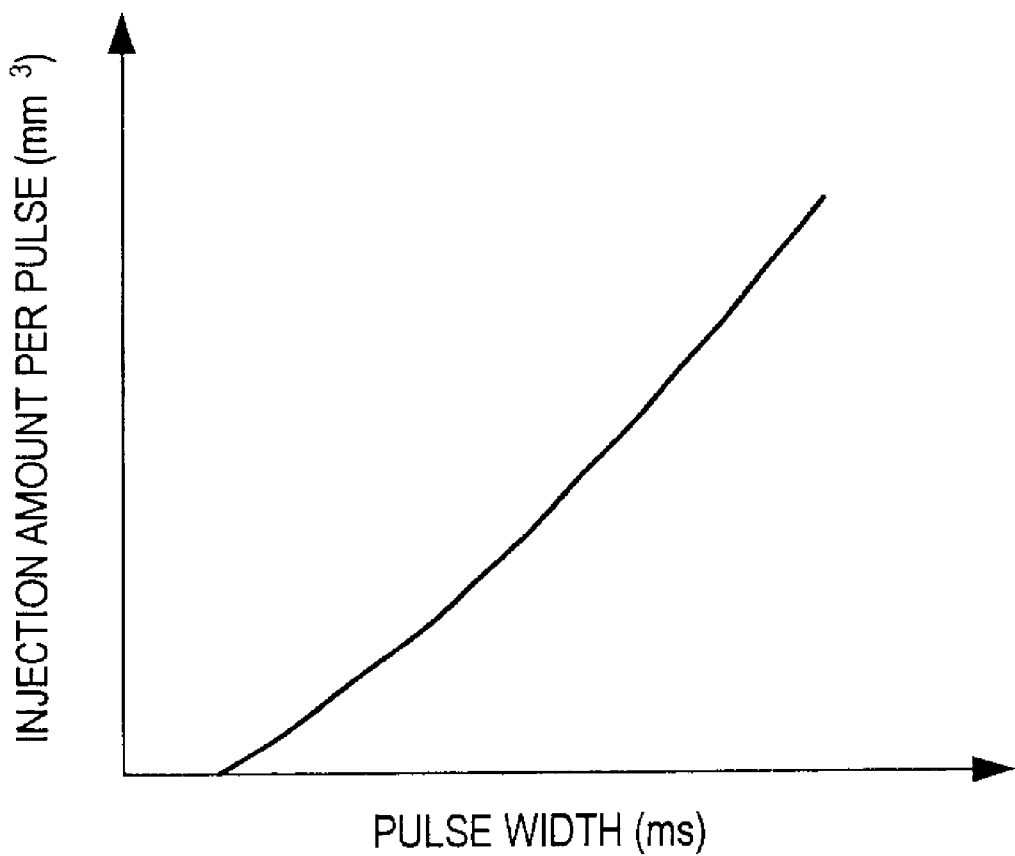
FIG. 9 is a table specifying a relation between a fuel injection pulse width and a fuel injection amount per pulse.

Specifically, in this type of common rail diesel engine, as in the case of an electronically controlled gasoline injection engine, there is a unique relation between the pulse width [ms] and the injection amount [mm³] per pulse as shown in FIG. 9, so the volume of consumed fuel can be computed based on the number of injections calculated from the engine rotation speed detected by the crank angle sensor 17.

In the aforesaid embodiment, the engine shaft torque was calculated by looking up a torque map, but when such a torque map does not exist, the indicated mean effective pressure can be calculated from the intake air amount and air-fuel ratio as described below, and the engine shaft torque calculated based thereon.

Figure 10:
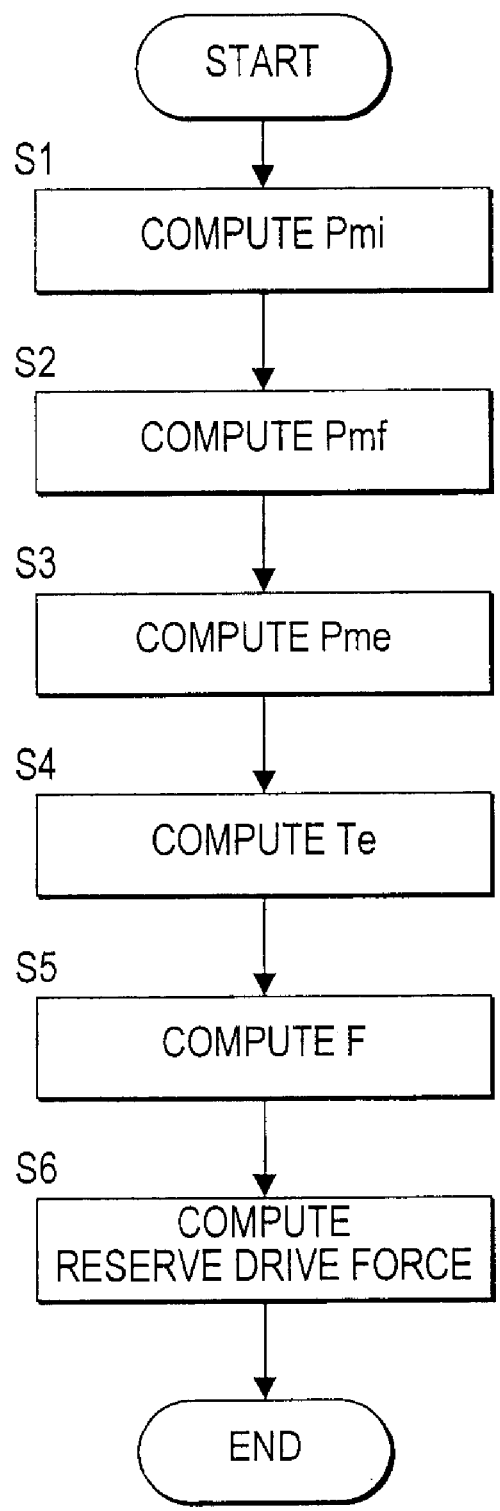
FIG. 10 is a flowchart showing the details of a routine for the calculating an engine shaft torque and drive force.

FIG. 10 is a flowchart of the processing performed to calculate the engine shaft torque and the drive force.

According to this, as the weight of intake air per cycle and the air-fuel ratio are calculated by the processing described heretofore, firstly, an indicated mean effective pressure Pmi [Pa] is calculated by looking up a predetermined table (step S1). Next, a friction mean effective pressure Pmf [Pa] is calculated by looking up a predetermined table based on the engine rotation speed detected by the crank angle sensor 17 (step S2). The friction mean effective pressure Pmf is directly proportional to roughly 1.5 times the engine rotation speed. A brake mean effective pressure Pme [Pa] is then computed by subtracting the friction mean effective pressure Pmf from the indicated mean effective pressure Pmi (step S3).

Pmi, Pmf, Pme are indicators (physical quantities) used to assess the characteristics of the engine regardless of the engine displacement. The engine shaft torque Te [N·m] can be calculated by the following Equation (15):

$$Te = \frac{Pme \cdot Vh}{4\pi} \quad (15)$$

from this and the engine displacement Vh [m³] (step S4). Equation (15) is an Equation for a four stroke engine, but in the case of a two stroke engine, Equation (16):

$$Te = \frac{Pme \cdot Vh}{2\pi} \qquad (16)$$

may be used instead.

The speed ratio it in various gear positions, final reduction gear ratio if, transmission efficiency η and dynamic load weighted radius r of the tires are already known, so the drive force for the corresponding accelerator depression amount may be calculated by Equation (8) (step S5). The reserve drive force may be calculated by subtracting the drive force corresponding to the above accelerator depression amount from the maximum drive force computed based on the maximum shaft torque at the present engine rotation speed which can be acquired from a catalogue or the like (step S6).

Further, when the maximum shaft torque at the present engine rotation speed is not known, or even if the maximum shaft torque is known but varies due to a time-dependent deterioration, etc., it may also be calculated by the following computation.

Figure 11:
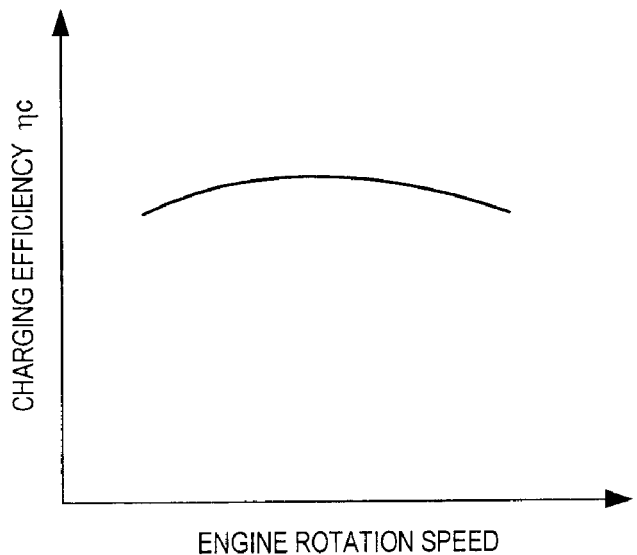
FIG. 11 is a table specifying a relation between an engine rotation speed and a charging efficiency.

To calculate the maximum shaft torque by computation, the charging efficiency or the weight of intake air per cycle when the accelerator depression amount is a maximum, is predicted from a research paper or a similar engine, and a table specifying the relation between the engine rotation speed and charging efficiency is prepared as shown in FIG. 11. Also, a table specifying the relation between the air-fuel ratio and Pmi100 (Pmi at the charging efficiency of 100%) is prepared as shown in FIG. 12 based on a common sense value or a value published in a research paper, etc.

Figure 12:
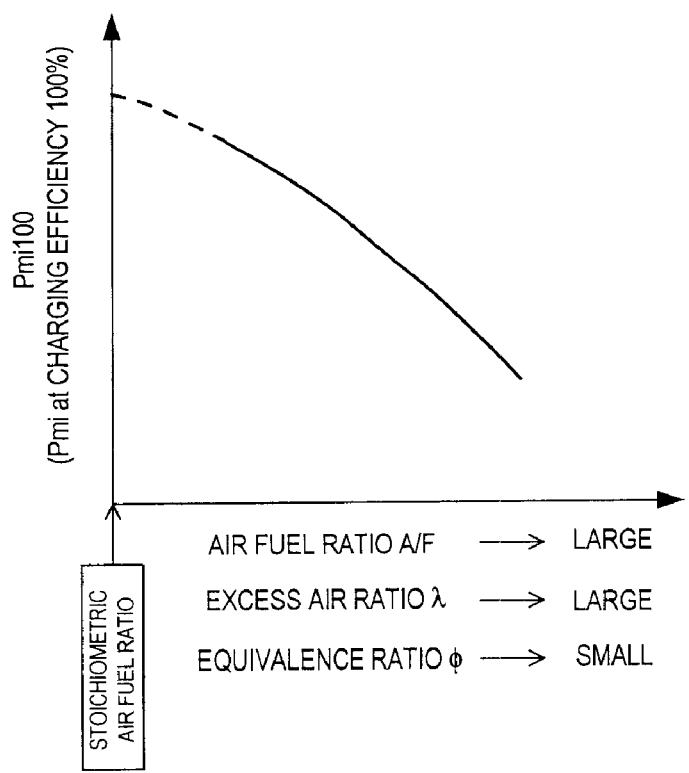
FIG. 12 is a table specifying a relation between the air-fuel ratio and an indicated mean effective pressure when the charging efficiency is 100%.
Figure 13:
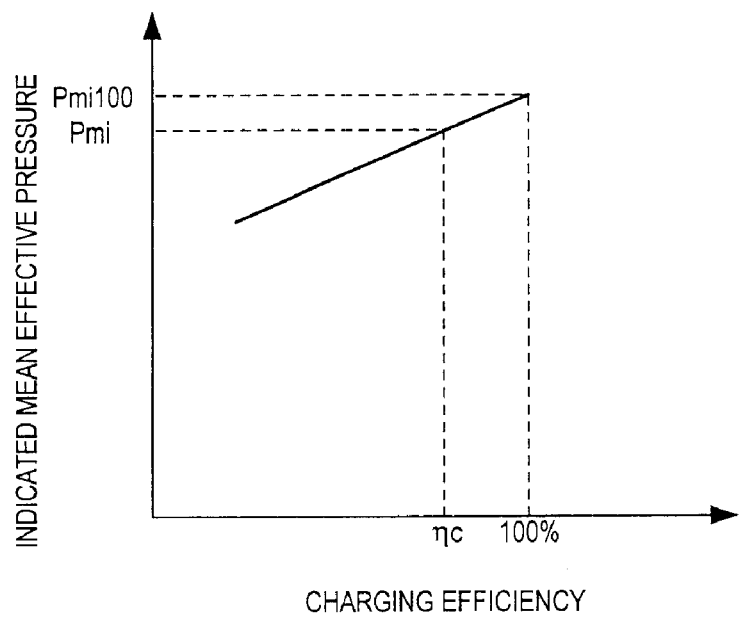
FIG. 13 is a diagram showing how the indicated mean effective pressure is calculated by a linear computation.
Figure 14:
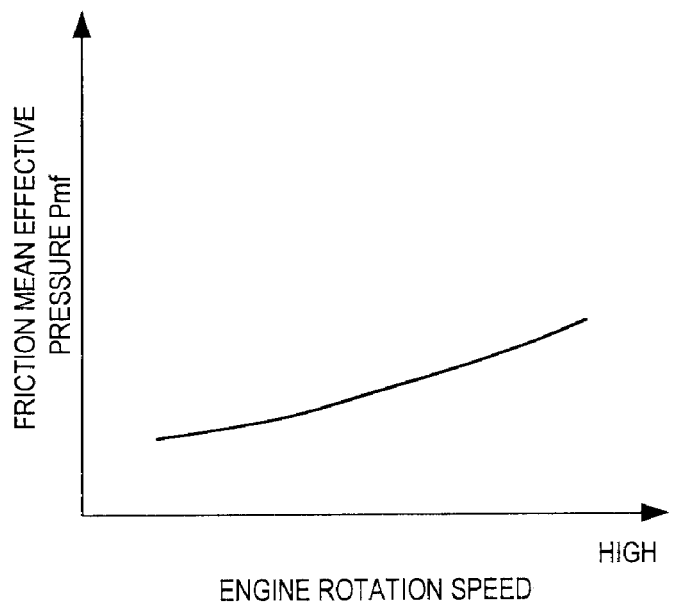
FIG. 14 is a table specifying a relation between the engine rotation speed and the friction mean effective pressure.

A charging efficiency ηc at the engine rotation speed detected by the crank angle sensor 17 and Pmi100 at the air fuel ratio detected by the air-fuel ratio sensor 16 are then calculated by looking up the table is shown in FIG. 11 and FIG. 12. If these values are found, as the indicated mean effective pressure Pmi is effectively directly proportional to the charging efficiency ηc for the same air-fuel ratio, Pmi at the present engine rotation speed may be calculated by a linear computation as shown in FIG. 13. Further, the friction mean effective pressure Pmf relative to the engine rotation speed may be prepared as a table as shown in FIG. 14, and Pmf at the corresponding engine rotation speed calculated by looking up this table.

If Pmi and Pmf are found in this way, the difference between the two is the brake mean effective pressure Pme when the acceleration depression amount is a maximum, and if Pme and the engine displacement are substituted in Equation (14) or Equation (15), the engine shaft torque when the accelerator depression amount is a maximum at the present engine rotation speed can be calculated.

The above constructions are only examples of a system applying this invention, and are not intended to limit the scope of the invention in anyway. This invention may be applied also to constructions other than those discussed here, for example, the analysis/display of recorded running state may also be performed by a vehicle-mounted device.

Further, the exchange of data between the vehicle-mounted device and the controlling computer may be performed by a method other than a memory card, transferred to a magnetic disk, or transferred by means of radio communication.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A vehicle state analysis system for a vehicle including an engine, comprising:
    a sensor which detects an air-fuel ratio of the exhaust of the engine, and
    a processor which functions to:
        compute a weight of fuel consumed by the engine based on an intake air amount and the air-fuel ratio of the engine, and
        compute a fuel consumption rate of the vehicle based on the computed weight of consumed fuel and the running distance of the vehicle.

2. The analysis system as defined in claim 1, wherein:
    the intake air amount is detected by an air flow meter of the engine.

3. The analysis system as defined in claim 1, further comprising:
    a sensor which detects an absolute pressure in an intake manifold of the engine, and wherein
    the processor further functions to compute the intake air amount based on the absolute pressure in the intake manifold of the engine and the displacement of the engine.

4. The analysis system as defined in claim 1, wherein:
    the processor further functions to
        convert the computed weight of consumed fuel into a flowrate of consumed fuel by dividing by a fuel density, and
        compute the fuel consumption rate by dividing a running distance of the vehicle by the flowrate of consumed fuel.

5. The analysis system as defined in claim 4, wherein:
    the processor further functions to correct the fuel density when the vehicle is stationary.

6. The analysis system as defined in claim 1, wherein:
    the processor further functions to
        compute a delay time of the detected air-fuel ratio relative to an actual air-fuel ratio, and
        compute the weight of fuel consumed by the engine prior to the delay time by dividing the weight of intake air prior to the delay time by the detected air-fuel ratio.

7. The analysis system as defined in claim 1, further comprising:
    a display device which displays the computed fuel consumption rate.

8. The analysis system as defined in claim 7, wherein:
    the processor further functions to modify the units of computed fuel consumption rate.

9. The analysis system as defined in claim 7, wherein:
    the processor further functions to
        compute a drive force of the vehicle,
        compute a running resistance based on a total weight of the vehicle, rolling resistance coefficient and vehicle speed, and
        compute an excess drive force by subtracting the running resistance from the drive force, and
    the display device further displays the computed excess drive force.

10. The analysis system as defined in claim 9, wherein:
    the processor further functions to correct the total weight of the vehicle when the vehicle is stationary.

11. The analysis system as defined in claim 9, wherein:
    the processor further functions to correct the rolling resistance coefficient from the deceleration state of the vehicle when the accelerator is off and the clutch is disengaged.

12. The analysis system as defined in claim 7, wherein:
the processor further functions to
  compute a drive force of the vehicle,
  compute a drive force for maximum accelerator depression, and
  compute a reserve drive force by subtracting the drive force from the drive force for maximum accelerator depression, and
the display device further displays the computed reserve drive force.

13. The analysis system as defined in claim 9, wherein:
the processor further functions to
  calculate an engine shaft torque by looking up a predetermined map based on an accelerator depression amount and engine rotation speed, and
  compute the drive force based on the engine shaft torque.

14. The analysis system as defined in claim 12, wherein:
the processor further functions to
  calculate an engine shaft torque by looking up a predetermined map based on an accelerator depression amount and engine rotation speed, and
  compute the drive force based on the engine shaft torque.

15. The analysis system as defined in claim 9, wherein:
the processor further functions to
  compute a brake mean effective pressure by subtracting a friction mean effective pressure according to an engine rotation speed from an indicated mean effective pressure computed based on the intake air amount per cycle and air-fuel ratio of the engine,
  compute an engine shaft torque based on the brake mean effective pressure and the displacement of the engine, and
  compute the drive force based on the engine shaft torque.

16. The analysis system as defined in claim 12, wherein:
the processor further functions to
  compute a brake mean effective pressure by subtracting a friction mean effective pressure according to an engine rotation speed from an indicated mean effective pressure computed based on the intake air amount per cycle and air-fuel ratio of the engine,
  compute an engine shaft torque based on the brake mean effective pressure and the displacement of the engine, and
  compute the drive force based on the engine shaft torque.

17. The analysis system as defined in claim 12, wherein:
the processor further functions to
  compute an indicated mean effective pressure for maximum accelerator depression based on the intake air amount per cycle and air-fuel ratio of the engine when the accelerator depression amount is a maximum,
  compute a brake mean effective pressure for maximum accelerator depression by subtracting a friction mean effective pressure according to an engine rotation speed from an indicated mean effective pressure for maximum accelerator depression,
  compute an engine shaft torque when the accelerator depression amount is a maximum based on the brake mean effective pressure for maximum accelerator depression and the displacement of the engine, and
  compute the drive force for maximum accelerator depression based on the engine shaft torque when the accelerator depression amount is a maximum.

18. The analysis system as defined in claim 7, wherein:
the processor further functions to
  determine hard braking or hard acceleration based on the degree of forward/reverse acceleration, and
  issue a warning to the driver when it is determined that there is hard braking or hard acceleration.

19. The analysis system as defined in any of claims 1, further comprising:
  a recording device which records the computation result of the processor on a record medium, and
  a second display device which displays the computation results recorded on the record medium after the vehicle is driven.

20. The analysis system as defined in claim 19, wherein:
the recording device records a gear position selected during running on the record medium, and
the second display device displays the frequency with which each gear position is selected.

21. The analysis system as defined in claim 20, wherein:
the recording device records a gear position selected during running on the record medium, and
the second display device displays the running distance in each gear position, or the proportion of the running distance in each gear position relative to the total running distance.

22. A method for analyzing the state of a vehicle including an engine, comprising:
detecting an air-fuel ratio of the exhaust gas of the engine,
computing a weight of fuel consumed by the engine based on an intake air amount and the air-fuel ratio of the engine, and
computing a fuel consumption rate of the vehicle based on the computed weight of consumed fuel and running distance of the vehicle.

* * * * *